(12) United States Patent
Munkberg et al.

(10) Patent No.: US 10,354,432 B2
(45) Date of Patent: Jul. 16, 2019

(54) TEXTURE SPACE SHADING AND RECONSTRUCTION FOR RAY TRACING

(71) Applicant: Intel Corporation, Santa Clara, CA (US)

(72) Inventors: Carl J. Munkberg, Malmö (SE); Jon N. Hasselgren, Bunkeflostrand (SE); Franz P. Clarberg, Lund (SE); Magnus Andersson, Helsingborg (SE); Robert M. Toth, Lund (SE); Jim K. Nilsson, Lund (SE); Tomas G. Akenine-Moller, Lund (SE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/088,418

(22) Filed: Apr. 1, 2016

(65) Prior Publication Data

US 2017/0206700 A1    Jul. 20, 2017

Related U.S. Application Data

(60) Provisional application No. 62/279,589, filed on Jan. 15, 2016.

(51) Int. Cl.
*G06T 15/04* (2011.01)
*G06T 15/00* (2011.01)
*G06T 15/06* (2011.01)
*G06T 15/80* (2011.01)

(52) U.S. Cl.
CPC ............ *G06T 15/04* (2013.01); *G06T 15/005* (2013.01); *G06T 15/06* (2013.01); *G06T 15/80* (2013.01); *G06T 2210/36* (2013.01)

(58) Field of Classification Search
None
See application file for complete search history.

(56) References Cited

U.S. PATENT DOCUMENTS 6,587,113 B1 *   7/2003   Baldwin ................. G06T 1/60
                                                             345/552
6,593,925 B1 *   7/2003   Hakura ................. G06T 13/20
                                                             345/426

(Continued)

FOREIGN PATENT DOCUMENTS

KR         20010114046 A      12/2001

OTHER PUBLICATIONS

Clarberg, Petrik, and Tomas Akenine-Möllery. "Practical product importance sampling for direct illumination." In Computer Graphics Forum, vol. 27, No. 2, pp. 681-690. Blackwell Publishing Ltd, 2008.*

(Continued)

*Primary Examiner* — Xiao M Wu
*Assistant Examiner* — Steven Z Elbinger
(74) *Attorney, Agent, or Firm* — Nicholson De Vos Webster & Elliott LLP

(57) ABSTRACT

An apparatus and method are described for texture space shading. For example, one embodiment of a method comprises: performing texture mapping to map one or more textures to surfaces of one or more objects in texture space within a ray tracing architecture; and performing sampling and reconstruction directly on the surfaces of the objects in the texture space.

26 Claims, 19 Drawing Sheets

(56) References Cited

U.S. PATENT DOCUMENTS

| | | | |
|---|---|---|---|
| 2007/0139433 A1* | 6/2007 | Anderson | G06T 15/06 345/582 |
| 2007/0206008 A1* | 9/2007 | Kaufman | G06T 15/06 345/424 |
| 2008/0225042 A1* | 9/2008 | Birtwistle | H04N 13/261 345/419 |
| 2011/0001756 A1 | 1/2011 | Burley | |
| 2013/0113801 A1 | 5/2013 | Monson et al. | |
| 2014/0028693 A1* | 1/2014 | Wang | G06F 12/0875 345/557 |
| 2014/0340390 A1* | 11/2014 | Lanman | G06T 15/04 345/419 |
| 2015/0262407 A1* | 9/2015 | Fursund | G06T 15/80 345/426 |

OTHER PUBLICATIONS

Burley, Brent, and Dylan Lacewell. "Ptex: Per-face texture mapping for production rendering." In Computer Graphics Forum, vol. 27, No. 4, pp. 1155-1164. Oxford, UK: Blackwell Publishing Ltd, 2008. (Year: 2008).*

Andersson M., et al., "Adaptive Texture Space Shading for Stochastic Rendering," EUROGRAPHICS 2014, 10 pages.

Burley B., et al., "Ptex: Per-face Texture Mapping for Production Rendering," Walt Disney Animation Studios, EGSR 2008, 37 pages.

Burns C. A., et al., "A Lazy Object-Space Shading Architecture with Decoupled Sampling," High Performance Graphics 2010, Intel Corporation, Stanford University, 39 pages.

Clarberg P., et al., "AMFS: Adaptive Multi-Frequency Shading for Future Graphics Processors," ACM Transactions on Graphics, 2014, vol. 33 (4), 12 pages.

Gribel C. J., et al., "High-Quality Spatio-Temporal Rendering using Semi-Analytical Visibility," ACM Transactions on Graphics, 2011, vol. 30(4), 11 pages.

International Search Report and Written Opinion for Application No. PCT/US2016/062268, dated Mar. 29, 2017, 14 pages.

Keller A., et al., "Path Space Filtering," in: Monte Carlo and Quasi-Monte Carlo Methods, Cools R., Nuyens D., ed., Springer Proceedings in Mathematics & Statistics, Apr. 2014, pp. 423-436.

Zimmer H., et al., "Path-space Motion Estimation and Decomposition for Robust Animation Filtering," Eurographics Symposium on Rendering, 2015, vol. 34(4), 12 pages.

Zwicker M., et al., "Re-cent Advances in Adaptive Sampling and Reconstruction for Monte Carlo Rendering," Computer Graphics Forum, Wiley, 2015, vol. 34 (2), 13 pages.

International Preliminary Report on Patentability for International Application No. PCT/US2016/062268, dated Jul. 26, 2018, 11 pages.

* cited by examiner

FIG. 9A GRAPHICS PROCESSOR COMMAND FORMAT
900
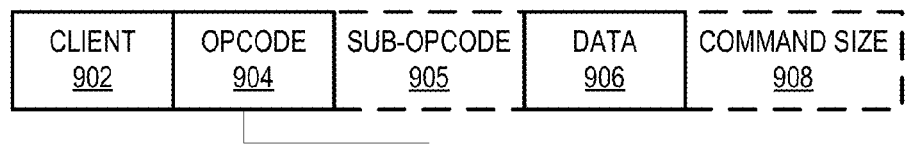
FIG. 9B GRAPHICS PROCESSOR COMMAND SEQUENCE
910
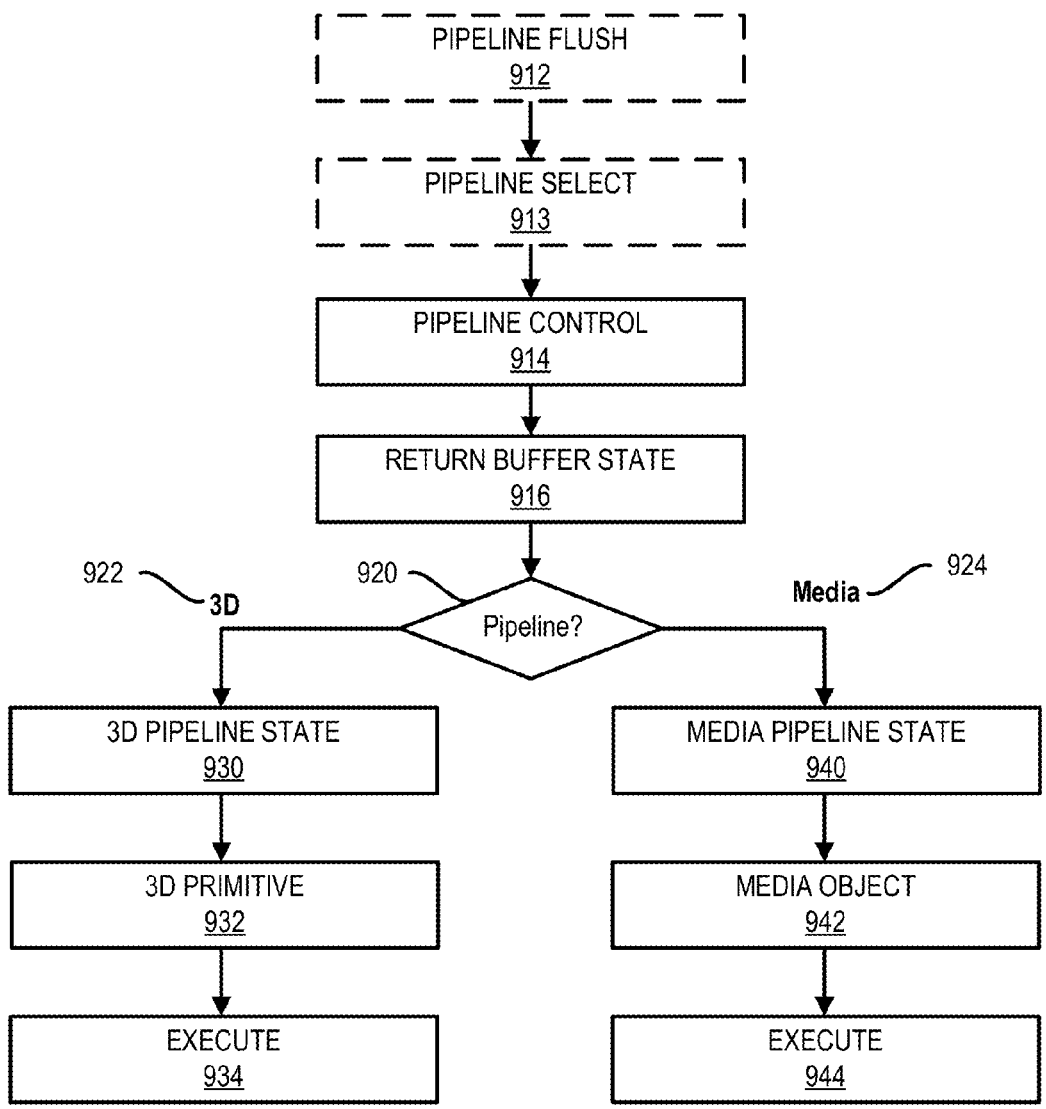

```
1   float3 shadeSample(int geomID, int primID, float2 uv)
2   {
3       key = sampleHash(geomID, primID, uv)
4       if sampleCache[key] == null: // Not in cache
5           (P, dPdu, dPdv) = interpolate(geomID, primID, uv)
6           sampleCache[key] = computeAO(P, dPdu, dPdv)
7       return sampleCache[key]
8   }
9
10  float3 shadeTexel(int geomID, int primID, float2 uv)
11  {
12      key = texelHash(geomID, primID, uv)
13      if texelCache[key] == null: // Not in cache
14          footprint = filterFootprint(geomID, primID, uv)
15          float3 col(0), float wsum(0)
16          for st in footprint:
17              w = weight(geomID, primID, st)
18              c = shadeSample(geomID, primID, st)
19              col += w * c, wsum += w
20          texelCache[key] = col / wsum
21      return sampleTexture(uv) * texelCache[key]
22  }
```

TEXTURE SPACE SHADING AND RECONSTRUCTION FOR RAY TRACING

CROSS REFERENCE TO RELATED APPLICATIONS

This application is related to and claims the benefit of U.S. Provisional Application Ser. No. 62/279,589, filed, Jan. 15, 2016, entitled "Texture Space Shading And Reconstruction For Ray Tracing", by which is hereby incorporated by reference herein in its entirety.

BACKGROUND

Field of the Invention

This invention relates generally to the field of computer processors. More particularly, the invention relates to an apparatus and method for texture space shading and reconstruction for ray tracing.

Description of the Related Art

Ray tracing is a graphics processing technique for generating an image by traversing the path of each light ray through pixels in an image plane and simulating the effects of its incidence upon different objects. Following traversal calculations, each ray is typically tested for intersection with some subset of the objects in the scene. Once the nearest object has been identified, the incoming light at the point of intersection is estimated, the material properties of the object are determined, and this information is used to calculate the final color of the pixel.

Ray tracing can generate extremely realistic images, but ray tracing techniques are costly in memory, computations, and power since billions of rays need to be traced and shaded to render a single image. With an insufficient number of rays, rendering is faster but the images are noisy due to the random nature of the sampling. Therefore, in offline rendering, advanced image denoising filters are commonly used to remove sampling noise. Most filters operate in screen space on sample data recorded during rendering. High-quality real-time ray tracing cannot realistically become a reality until such denoising filters are efficient enough for real-time implementations on graphics processing units (GPUs) or central processing units (CPUs).

However, existing techniques take seconds, or even minutes per frame, and typically require several full-screen auxiliary buffers to guide the reconstruction process. In addition, due to an underlying assumption of noise-free guide images, these approaches struggle with camera effects such as defocus and motion blur. Another challenge for image-space filters is visibility discontinuities, which occur, for example, at object boundaries where samples from the foreground and background mix. A lot of the complexity in existing filters comes from trying to filter across such discontinuities while preserving sharp edges and other image features. Previous research has attempted to address some of these limitations by filtering directly in path space or object space. However, these methods require complex data structures and expensive queries (e.g. kNN-searches) to locate nearby samples in large 3D data sets.

With today's fast ray tracers such as Intel's Embree and NVIDIA's OptiX, and emerging hardware ray tracing on the horizon, reasonably complex scenes can be rendered in real time; however, only at very limited sampling budgets (e.g. 8 or 16 primary rays per pixel). Consequently, fast and high-quality filtering solutions are needed.

We describe a novel approach for sampling and filtering, which allows more efficient implementation, reuse of results, limited memory footprint, and separate handling of camera effects. The approach can be used today for near real-time previsualization of ray traced scenes, or implemented in future hardware/software on GPUs.

BRIEF DESCRIPTION OF THE DRAWINGS

A better understanding of the present invention can be obtained from the following detailed description in conjunction with the following drawings, in which:

FIG. 9A is a block diagram illustrating a graphics processor command format according to an embodiment;

FIG. 9B is a block diagram illustrating a graphics processor command sequence according to an embodiment;

FIG. 18 illustrates exemplary shader pseudo code which may be implemented in accordance with an embodiment of the invention;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Graphics Processor Architectures and Data Types

System Overview

Figure 1:
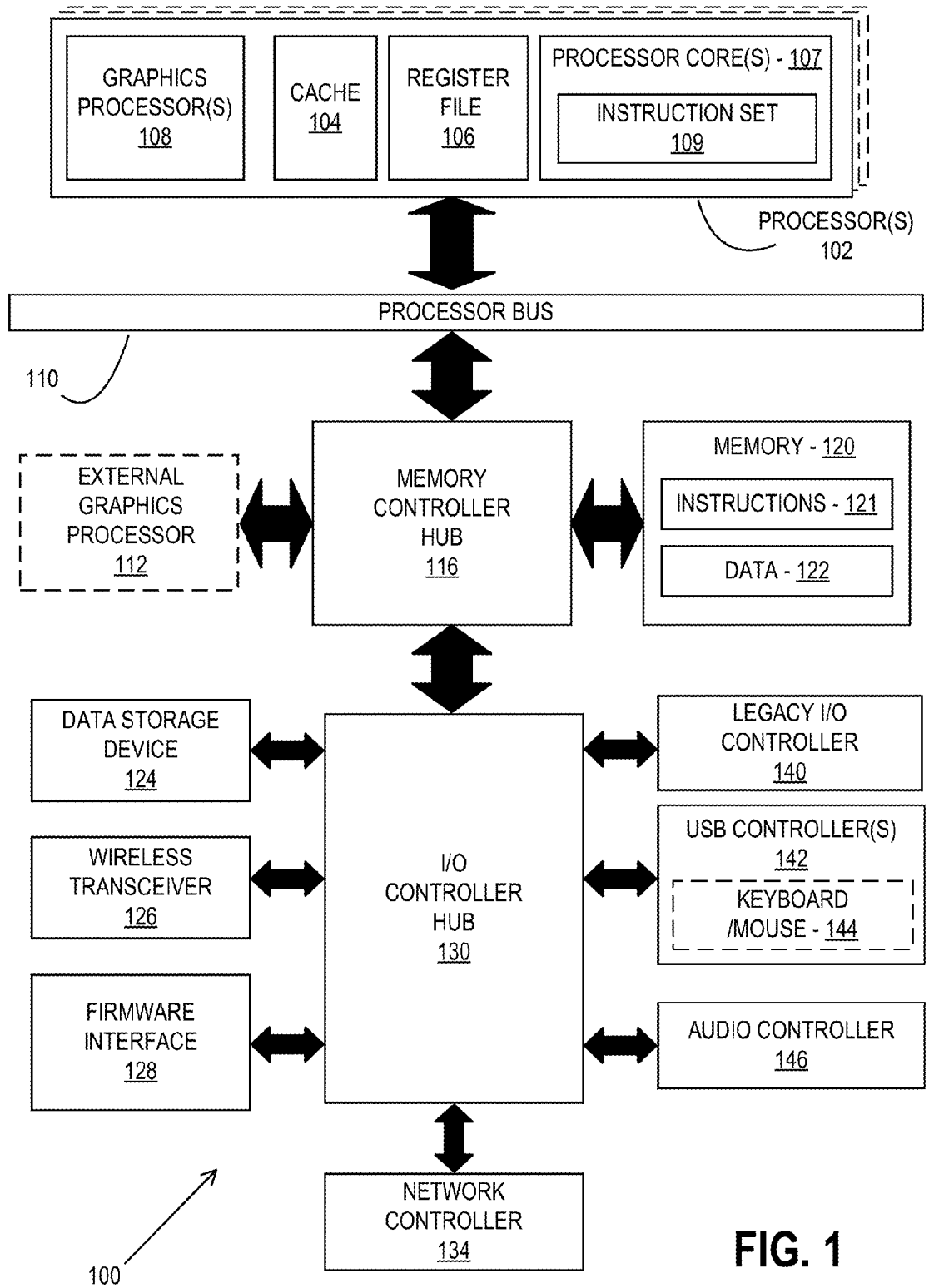
FIG. 1 is a block diagram of an embodiment of a computer system with a processor having one or more processor cores and graphics processors.

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
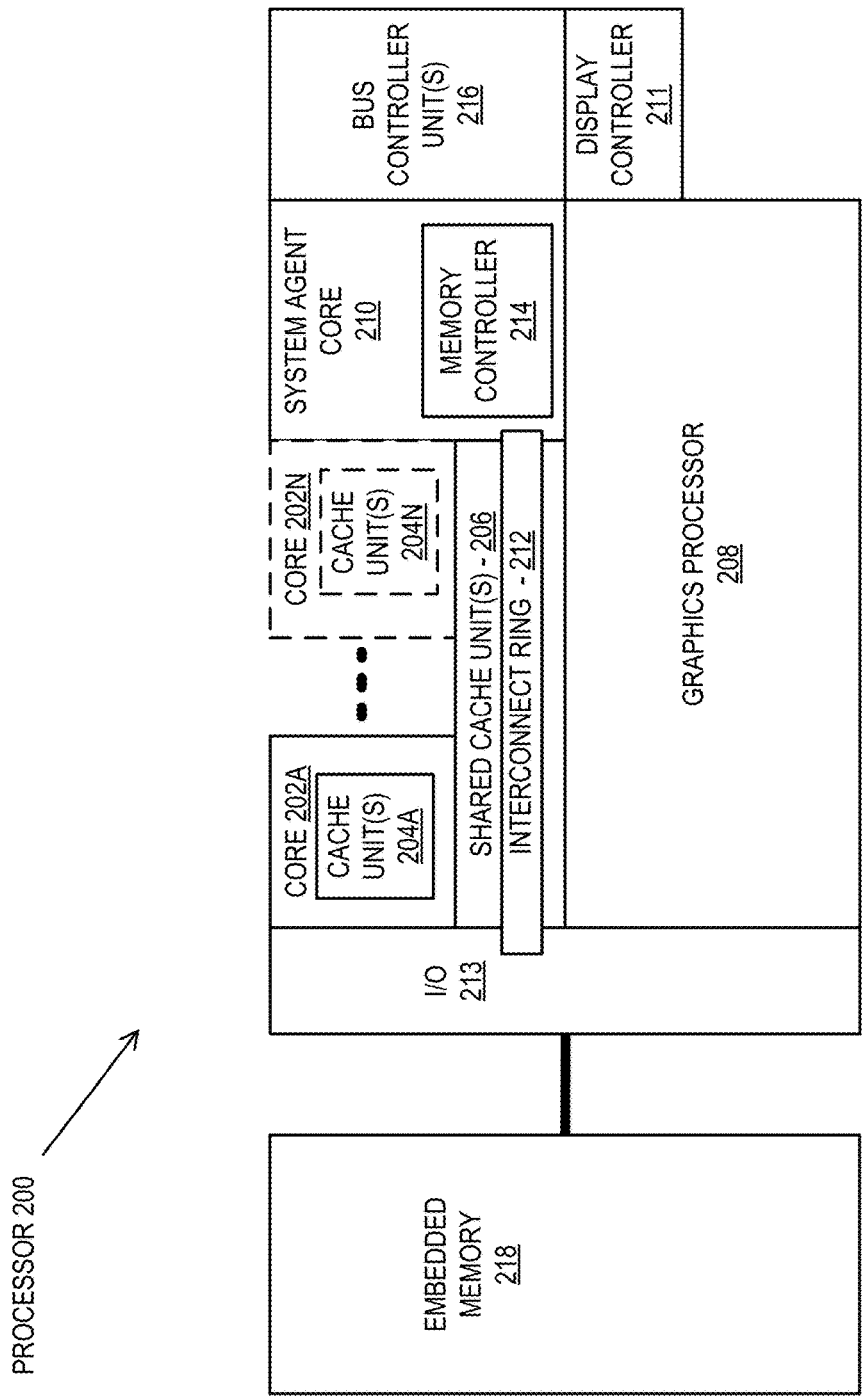
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
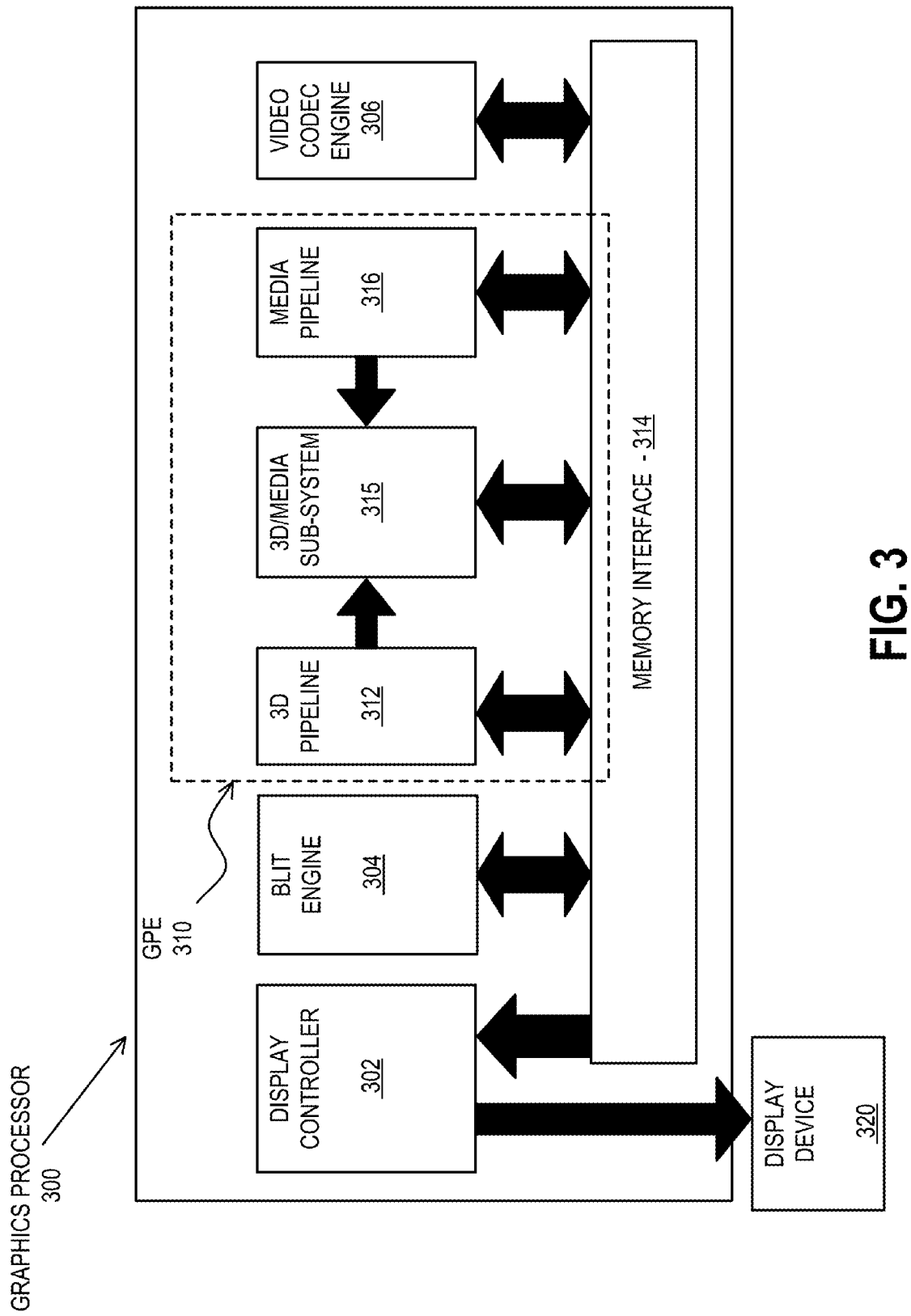
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
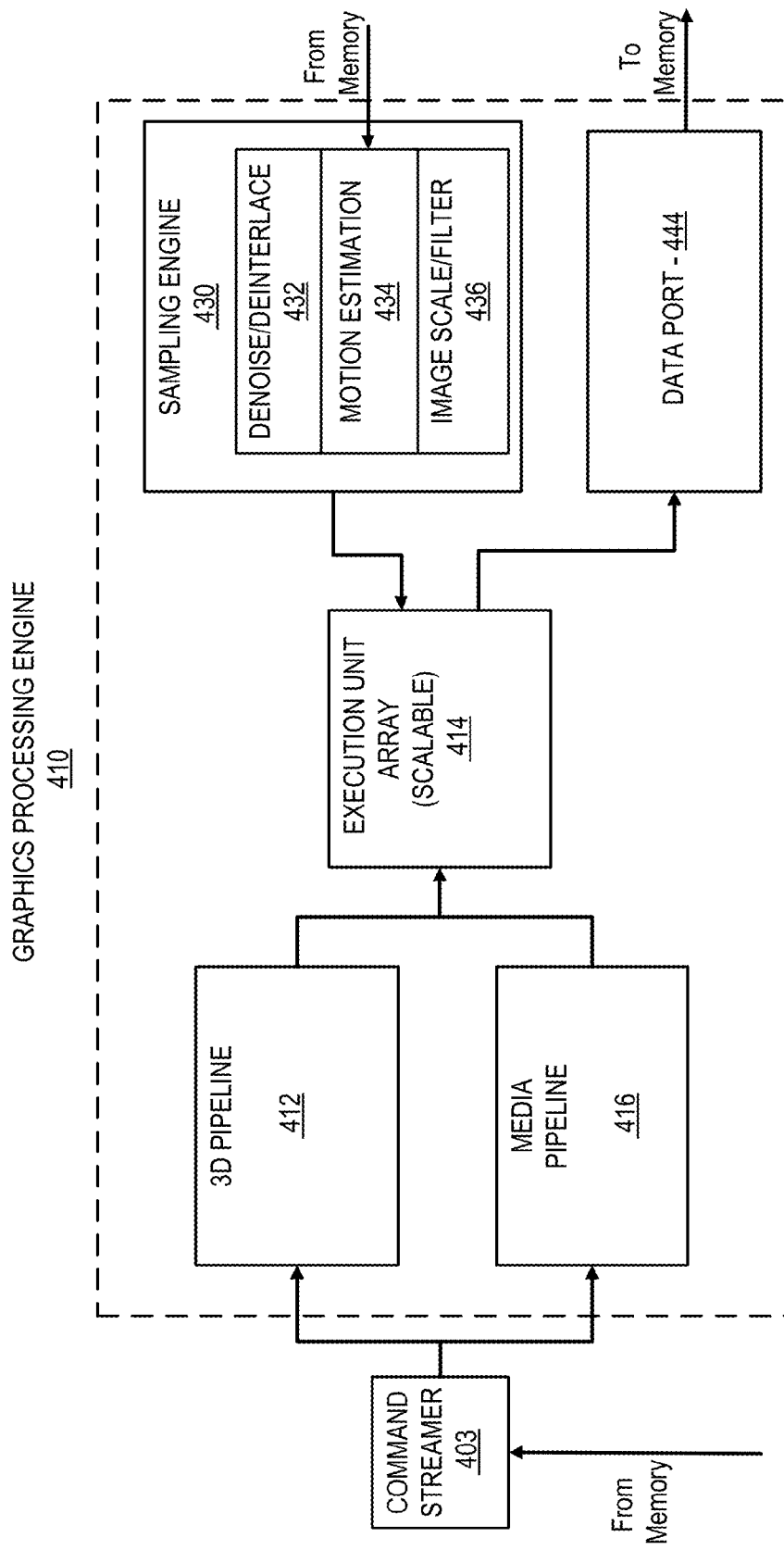
FIG. 4 is a block diagram of an embodiment of a graphics-processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
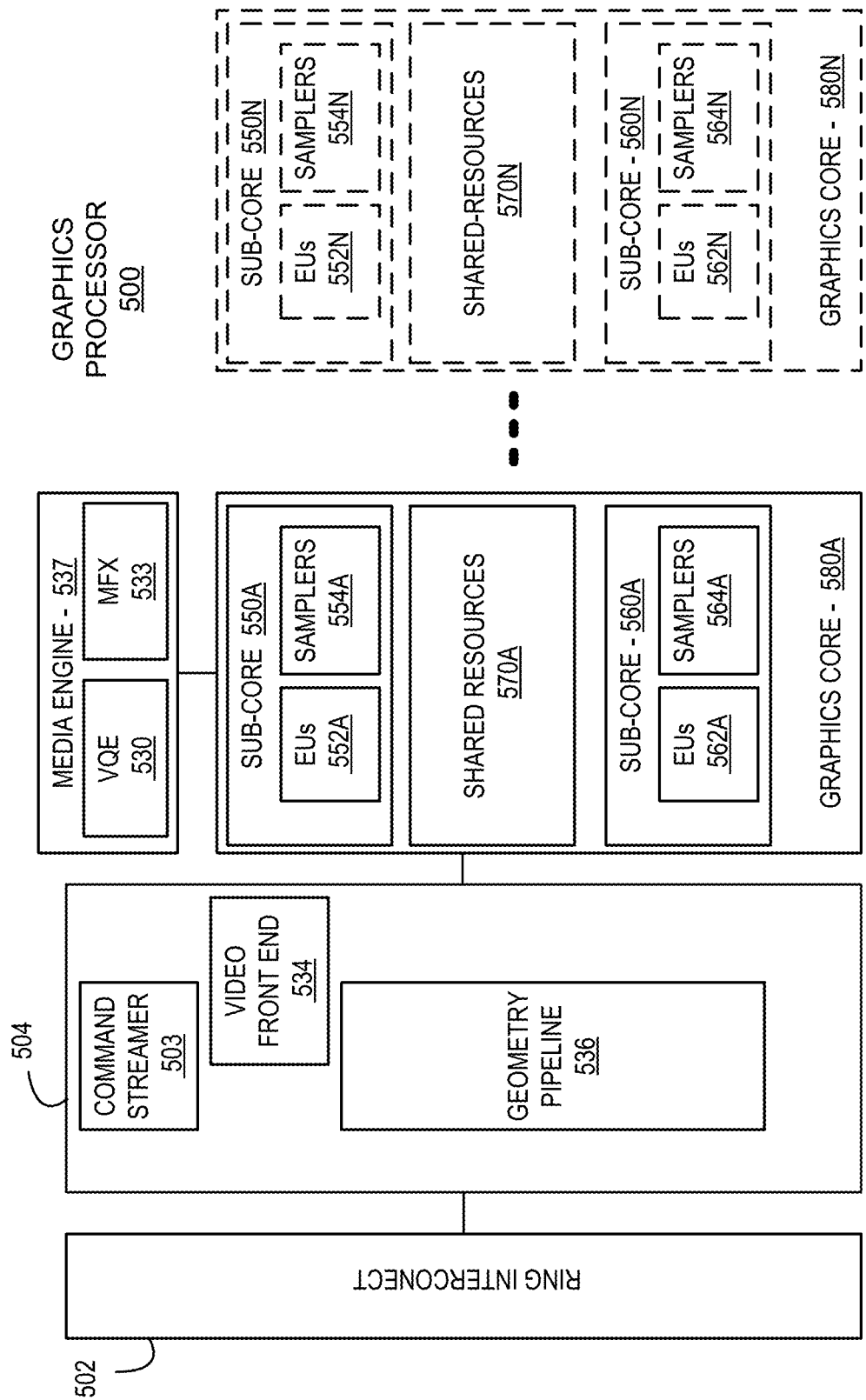
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
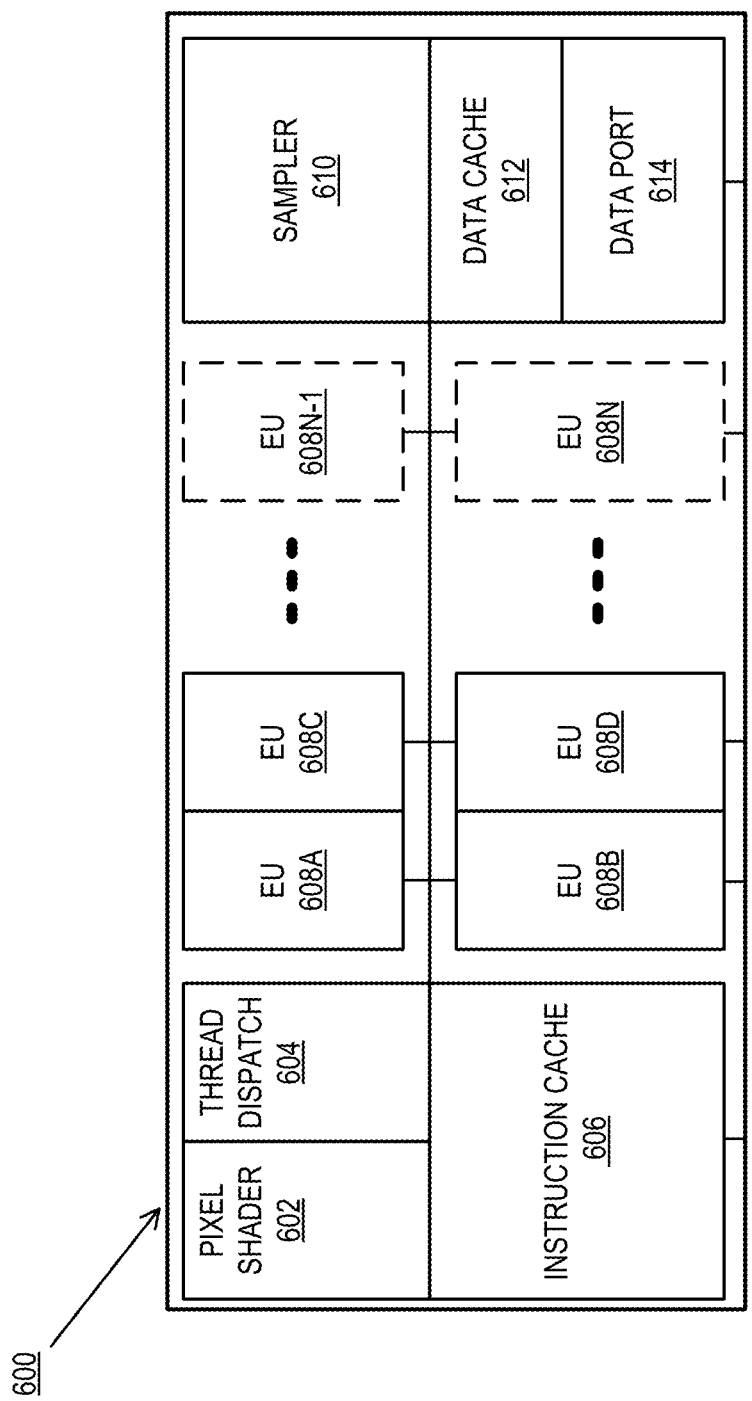
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

Figure 7:
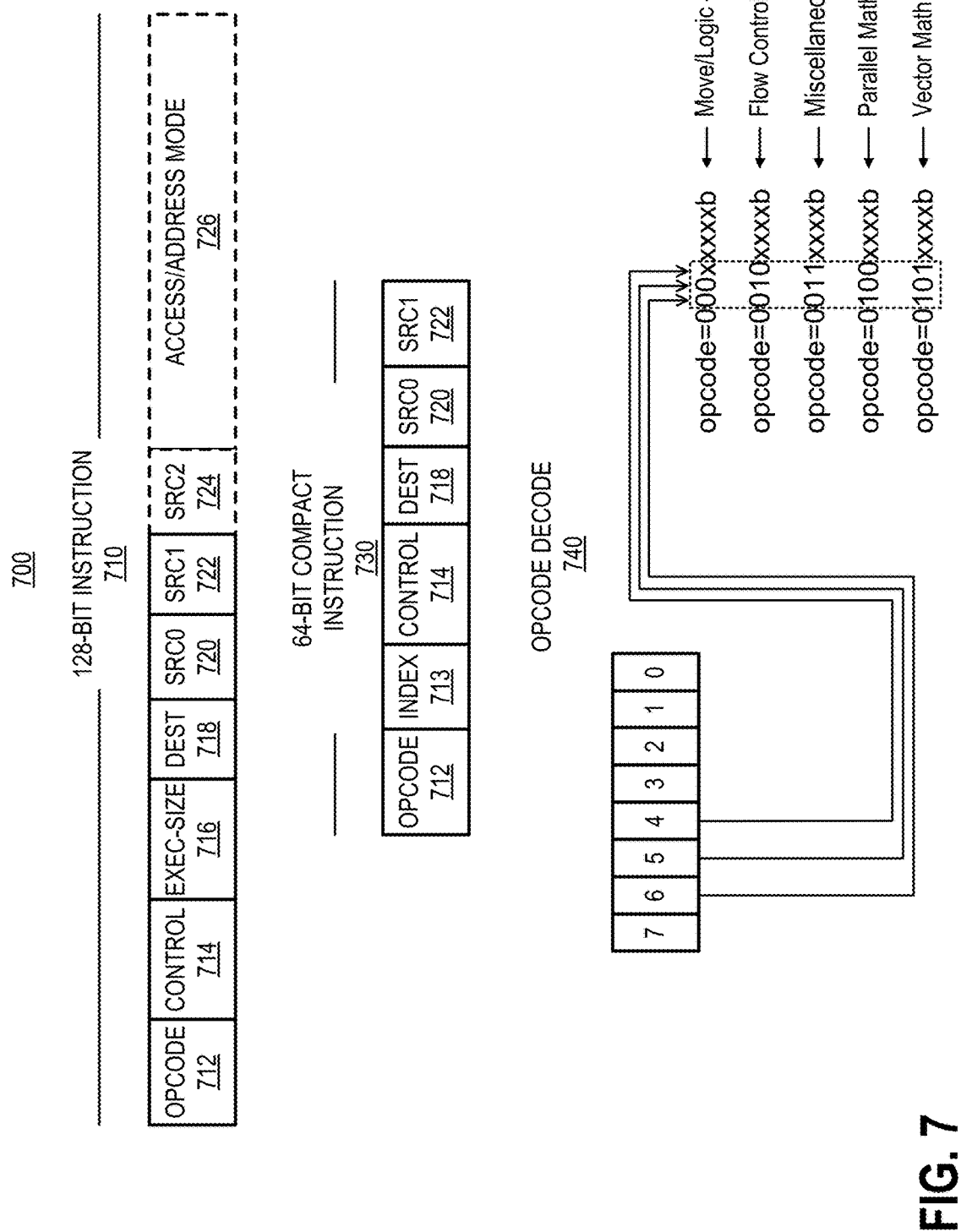
FIG. 7 illustrates a graphics processor execution unit instruction format according to an embodiment.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 722, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
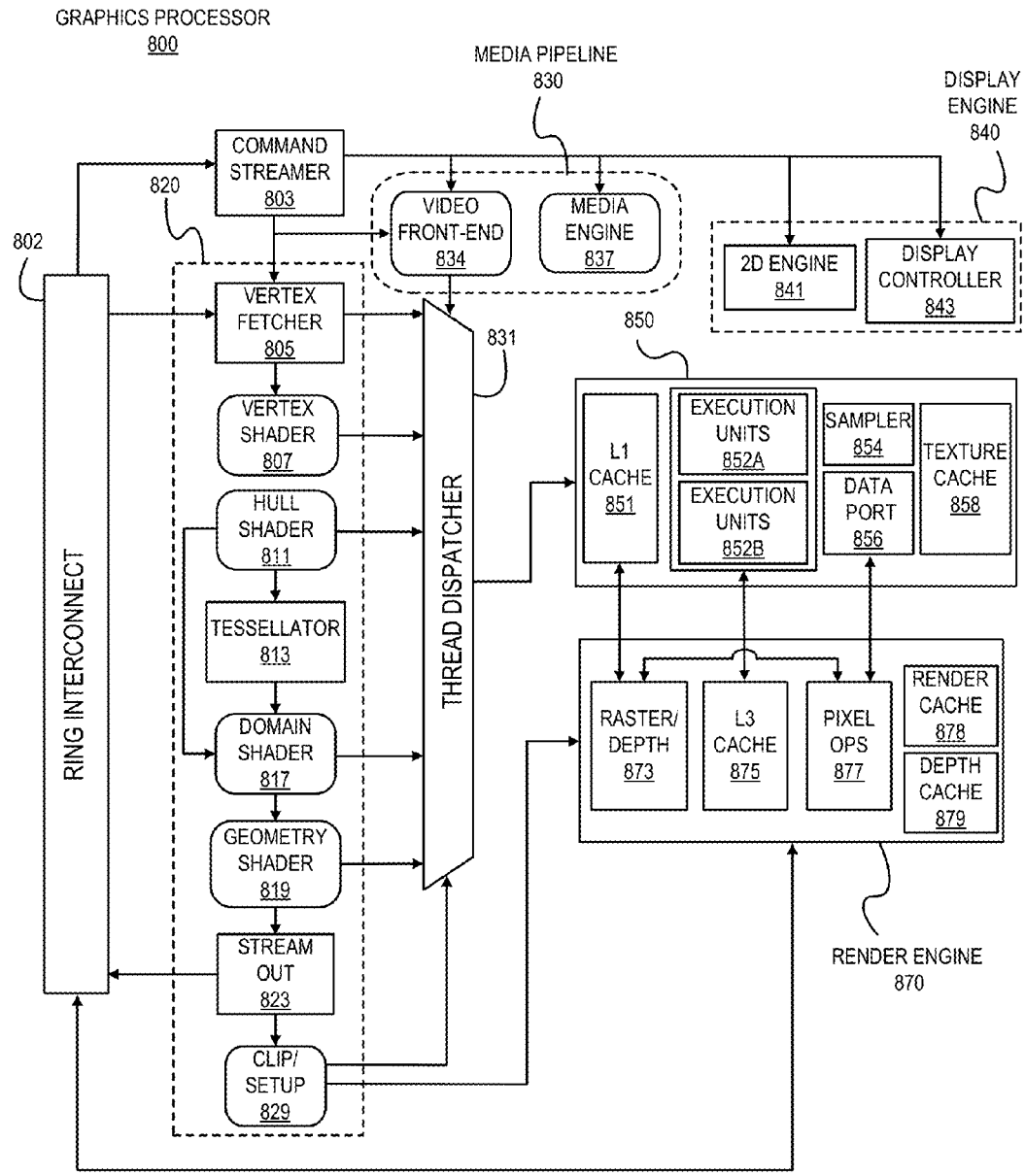
FIG. 8 is a block diagram of another embodiment of a graphics processor which includes a graphics pipeline, a media pipeline, a display engine, thread execution logic, and a render output pipeline.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 337 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
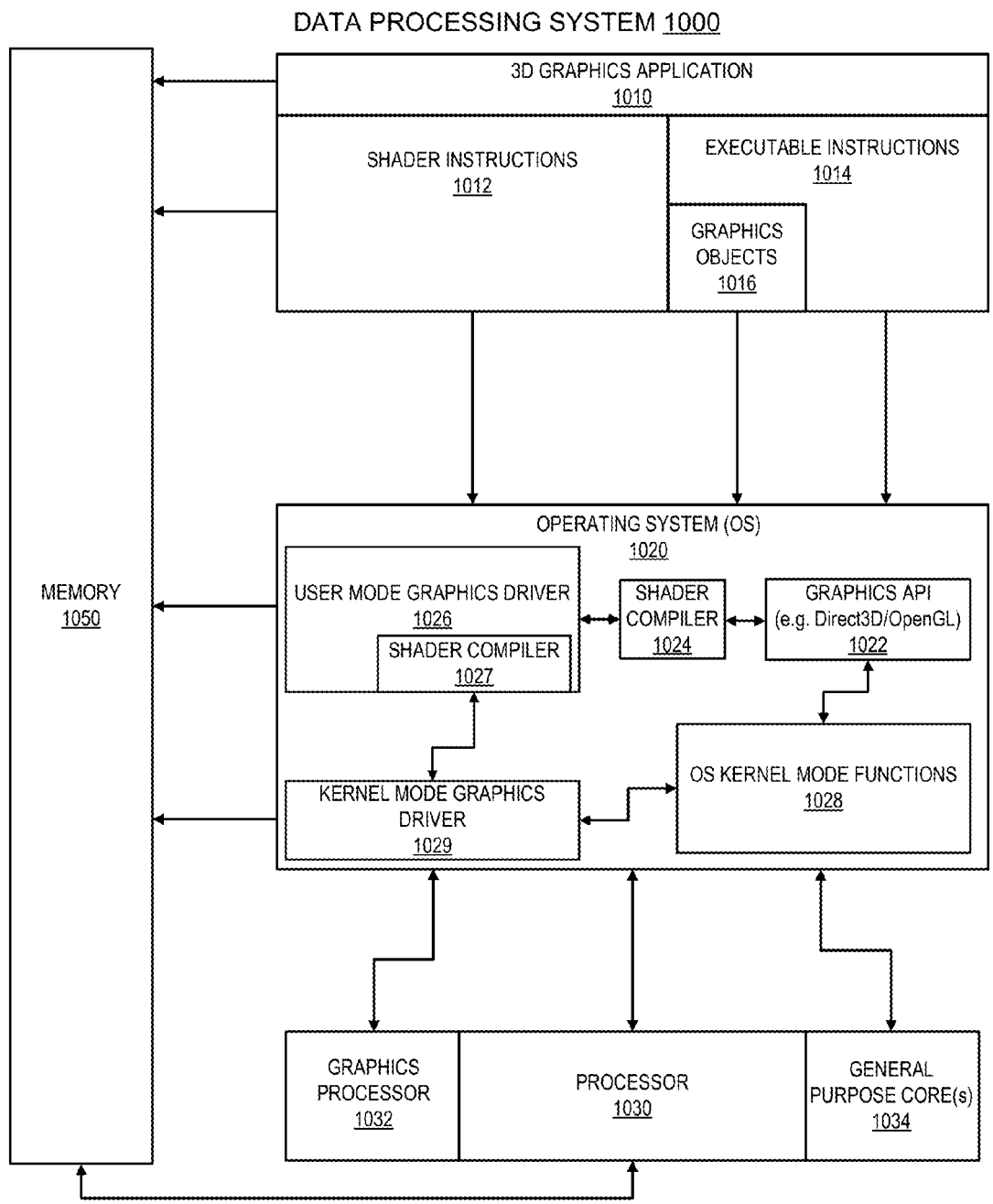
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
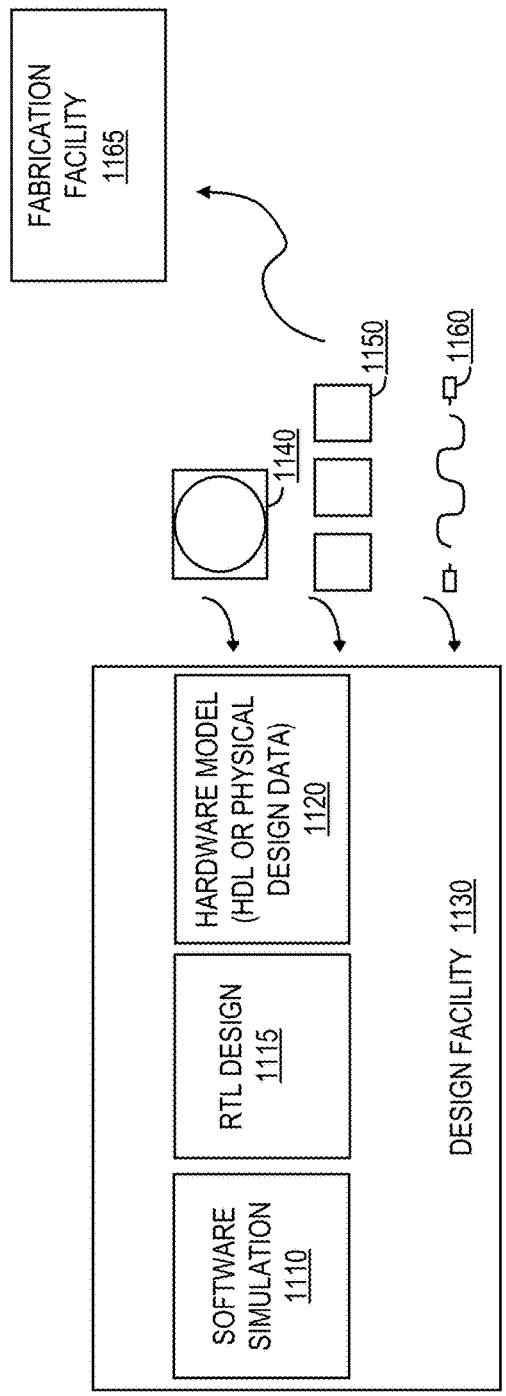
FIG. 11 illustrates an exemplary IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1100. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
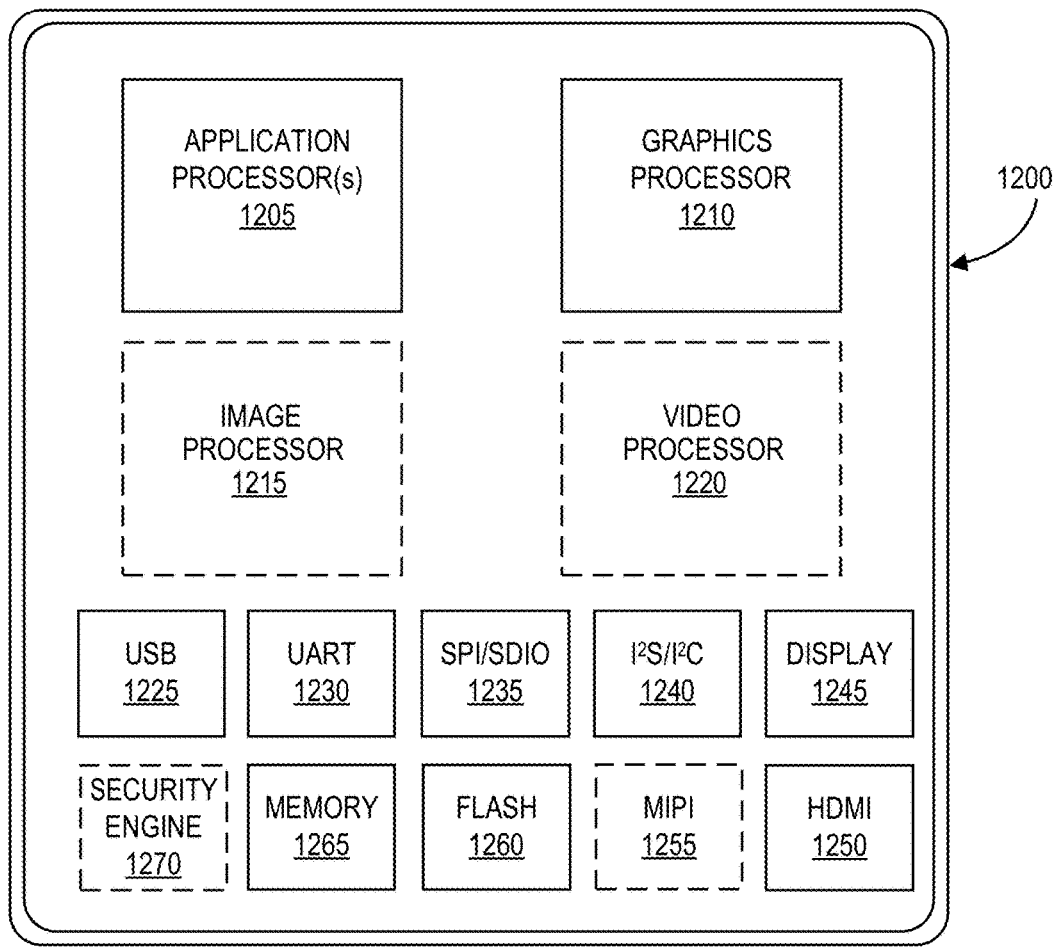
FIG. 12 illustrates an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general purpose processor cores.

Method and Apparatus for Texture Space Shading

As mentioned, ray tracing can generate extremely realistic images, but ray tracing techniques are costly in terms of memory, computations, and power since billions of rays need to be traced and shaded to render a single image. With an insufficient number of rays, rendering is faster but the images are noisy due to the random nature of the sampling. Therefore, in offline rendering, advanced image denoising filters are commonly used to remove sampling noise. Most filters operate in screen space on sample data recorded during rendering. High-quality real-time ray tracing cannot realistically become a reality until such denoising filters are efficient enough for real-time implementations on graphics processing units (GPUs) or central processing units (CPUs).

However, existing techniques take seconds, or even minutes per frame, and typically require several full-screen auxiliary buffers to guide the reconstruction process. In addition, due to an underlying assumption of noise-free guide images, these approaches struggle with camera effects such as defocus and motion blur. Another challenge for image-space filters is visibility discontinuities, which occur, for example, at object boundaries where samples from the foreground and background mix. A lot of the complexity in existing filters comes from trying to filter across such discontinuities while preserving sharp edges and other image features. Previous research has attempted to address some of these limitations by filtering directly in path space or object space. However, these methods require complex data structures and expensive queries (e.g. kNN-searches) to locate nearby samples in large 3D data sets.

With today's fast ray tracers such as Intel's Embree and NVIDIA's OptiX, and emerging hardware ray tracing on the horizon, reasonably complex scenes can be rendered in real time; however, only at very limited sampling budgets (e.g. 8 or 16 primary rays per pixel). Consequently, fast and high-quality filtering solutions are needed.

The embodiments of the invention include a novel approach for sampling and filtering, which allows more efficient implementation, reuse of results, limited memory footprint, and separate handling of camera effects. These embodiments can be used today for near real-time previsualization of ray-traced scenes, or implemented in future hardware/software on GPUs.

In particular, one embodiment performs sampling and reconstruction (denoising) directly on the surfaces of objects, i.e., in texture space, rather than in screen space. Individual texels or groups of texels are sampled and cached, and when all texels under the footprint of a reconstruction filter kernel are available, the filter is evaluated and the resulting (noise-free) color cached for later reuse.

Figure 13:
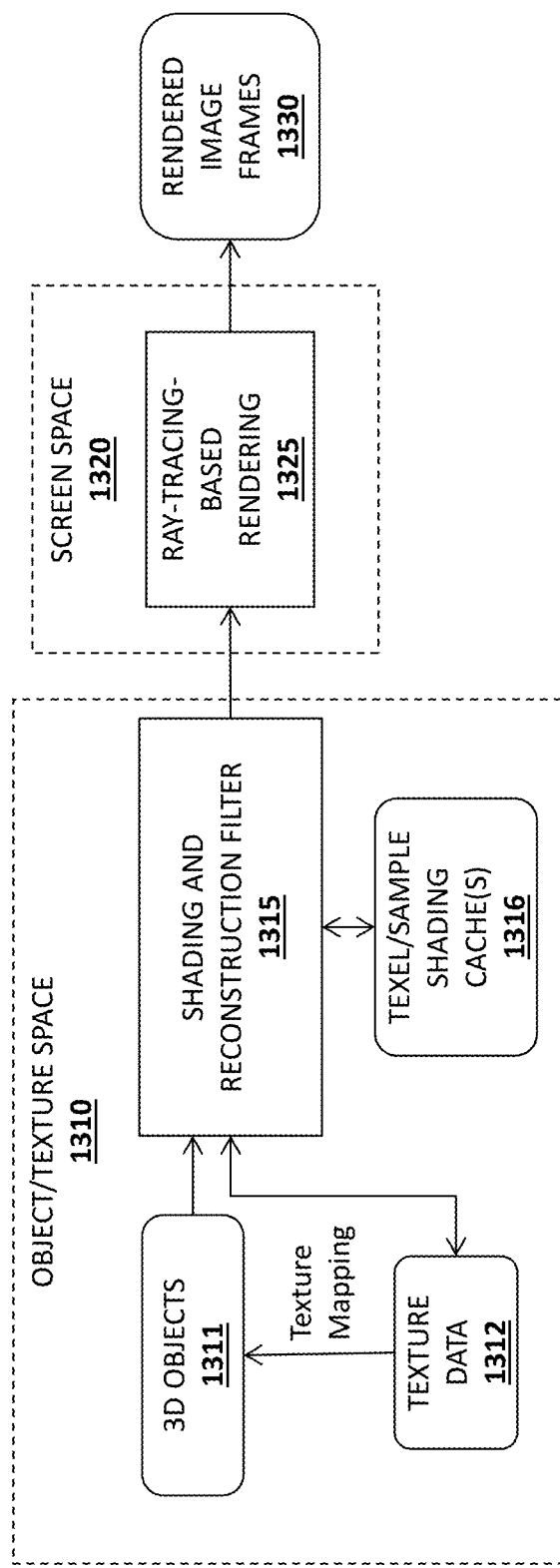
FIG. 13 illustrates one embodiment of the invention in which shading is performed in object/texture space.

One such embodiment is illustrated in FIG. 13, in which texture mapping is performed which maps texture data 1312 (e.g., mip-maps as discussed below) to 3D objects in object-texture space. In particular, object/texture space circuitry and/or logic 1310 includes a shading and reconstruction filter 1315 which performs the sampling and reconstruction techniques described herein directly on the surfaces of objects 1311 (rather than in screen space 1320 as in prior implementations). The resulting shaded texels and samples are stored in a texel/sample shading cache 1316 so that they may be re-used as needed. Screen space circuitry/logic includes ray tracing-based rendering 1325 which is performed on the filtered texture-mapped object data to generate a set of rendered image frames 1330.

By operating in texture space, simpler and more specialized filters can be applied, since each filter kernel only processes samples from a continuous surface with often coherent material properties. The system can also be implemented in a streaming fashion, which keeps the memory footprint small and lends itself to efficient GPU implementation in hardware or software.

The following techniques are described in terms of rendering tessellated meshes using the Ptex parameterization [See, e.g., BURLEY, B., AND LACEWELL, D. 2008; Ptex: Per-Face Texture Mapping for Production Rendering. In Eurographics Symposium on Rendering, 1155-1164]. In this case, shading values are parameterized as grids in the local uv-coordinates of each face (patch). When a filter extends beyond the current patch, the Ptex adjacency information is used to locate texels from the neighboring patches. These techniques are not limited to this particular case—other embodiments may use other texture parameterizations.

In some embodiments, the shading grids are hierarchically organized as an image pyramid of shading values per face, which are lazily populated based on the ray differentials on the incoming ray that trigged the shading request. Unlike prior implementations, shading is triggered and cached within the local filter footprint around the shading request. This allows the local shading to be directly reconstructed and the filtered result stored to a per-face texture.

Each grid may, for example, be of twice the resolution of the previous grid. The data structure is then equivalent to a texture mipmap hierarchy per face (e.g., such as used by Gribel et al. 2011, Clarberg et al. 2014). Each shading grid point is denoted a texel. The terms "texel" and "shading grid point" are used interchangeably herein.

Figure 14:
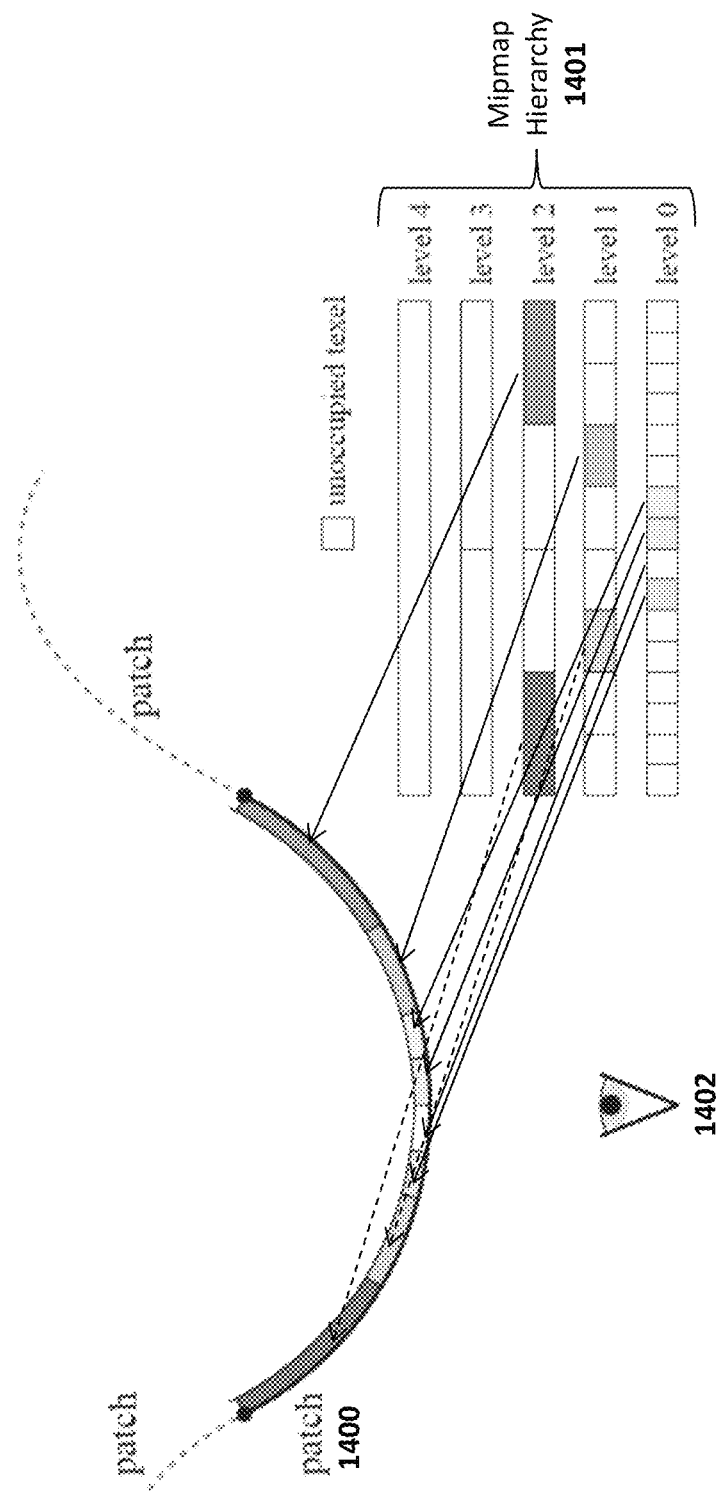
FIG. 14 illustrates an exemplary mipmap hierarchy applied to an exemplary patch.

FIG. 14 provides an exemplary patch 1400 and its corresponding mipmap hierarchy. A viewer, represented by an eye 1402, looks at a patch 1400 which is connected to other patches. The example is visualized in one dimension for simplicity, so that the surface patch is a curve and the mipmap hierarchy 1401 consists of one-dimensional images instead of two-dimensional images. The footprint when the viewer looks straight on the surface becomes small, and so level 0 becomes occupied with 4 texel values in this case. On the sides, the footprint increases and level 1 and level 2 become occupied by a few texels as well.

Figure 15:
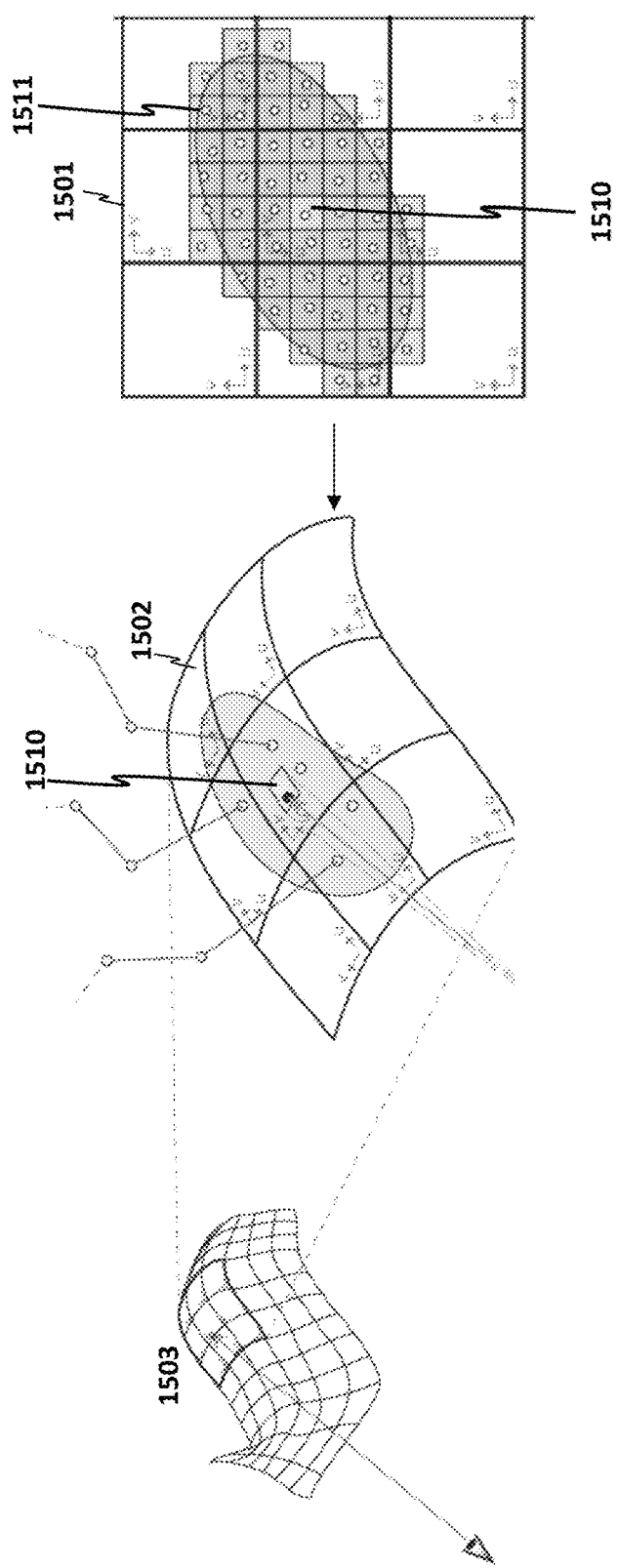
FIG. 15 illustrates an example in which a texture map is applied to a patch of an object.

FIG. 15 illustrates an example in which a texture map 1501 is applied to a patch 1502 of an object 1503. The core idea is to evaluate, filter and cache shading in texture space, i.e., on the surfaces of objects, in a ray tracer. In one embodiment, Ptex is used to define a texture parameterization where each quadrilateral patch is represented by a single texture mipmap hierarchy. In order to shade a particular texel (e.g., square 1510), the filter footprint 1511 is determined and all texels under the footprint (the remaining squares in 1501) are queried from a shading cache. Texels that are not already cached are shaded (which may involve sending secondary rays to compute incident illumination). Once all texels under the footprint are available, the reconstruction filter is evaluated to remove noise directly in texture space and the filtered color is stored at the grid cell that triggered the operation (square 1501). One embodiment of the system differentiates between shaded but not already filtered cells, and final filtered cells, keeping both types cached only for as long as necessary and/or dictated by the cache capacity, in some embodiments. The texture space grid and the intermediate non-filtered sample grid can be of the same or different resolutions.

One embodiment of the invention performs the following sequence of operations:

1. Trace a set of camera rays. At each intersection, quantize to the shading grid resolution of the intersecting patch and check if the "nearest" texel(s) is already shaded. Note that in this operation, a texture filter may be applied, so "nearest" may refer to the single nearest texel, the nearest four texels if bilinear filtering is done, or a larger group of texels if more complex texture filters are used (e.g., trilinear, bicubic, anisotropic).

2. If the nearest texel(s) is not already shaded, the filter footprint at this point is computed. The footprint may be a function of the ray's screen space extents (ray differentials), the material at the hit point, user-defined parameters, and any other parameters.

3. For each shading sample point under the footprint, check if it is already populated in the fat sample cache. Dispatch shading for each shading point (sample) that is not already shaded. Shading may involve evaluating complex material functions, tracing secondary rays, and running user-defined programs (shaders).

4. Once shaded, apply a reconstruction filter in a local region of texture space and store the filtered color at the nearest texel(s).

5. Repeat at operation 1 until all camera rays have been traced. This decision may be guided by adaptive sampling, noise estimations, fixed time or compute budgets, or user control.

6. Optionally, apply a separate reconstruction filter for defocus and motion blur [see, e.g., Munkberg et al., Layered Reconstruction for Defocus and Motion Blur 2014]. This filter may operate in screen space on the already filtered texels computed in steps 1-5.

The above operations temporarily hold "fat" samples in texture space, which may contain color, normals, and any auxiliary per-sample data needed for the reconstruction filter. In some embodiments, once a region is filtered, only the filtered color is retained in the per-face texture. A region may be defined as a patch and its nearest neighbors.

Figure 16:
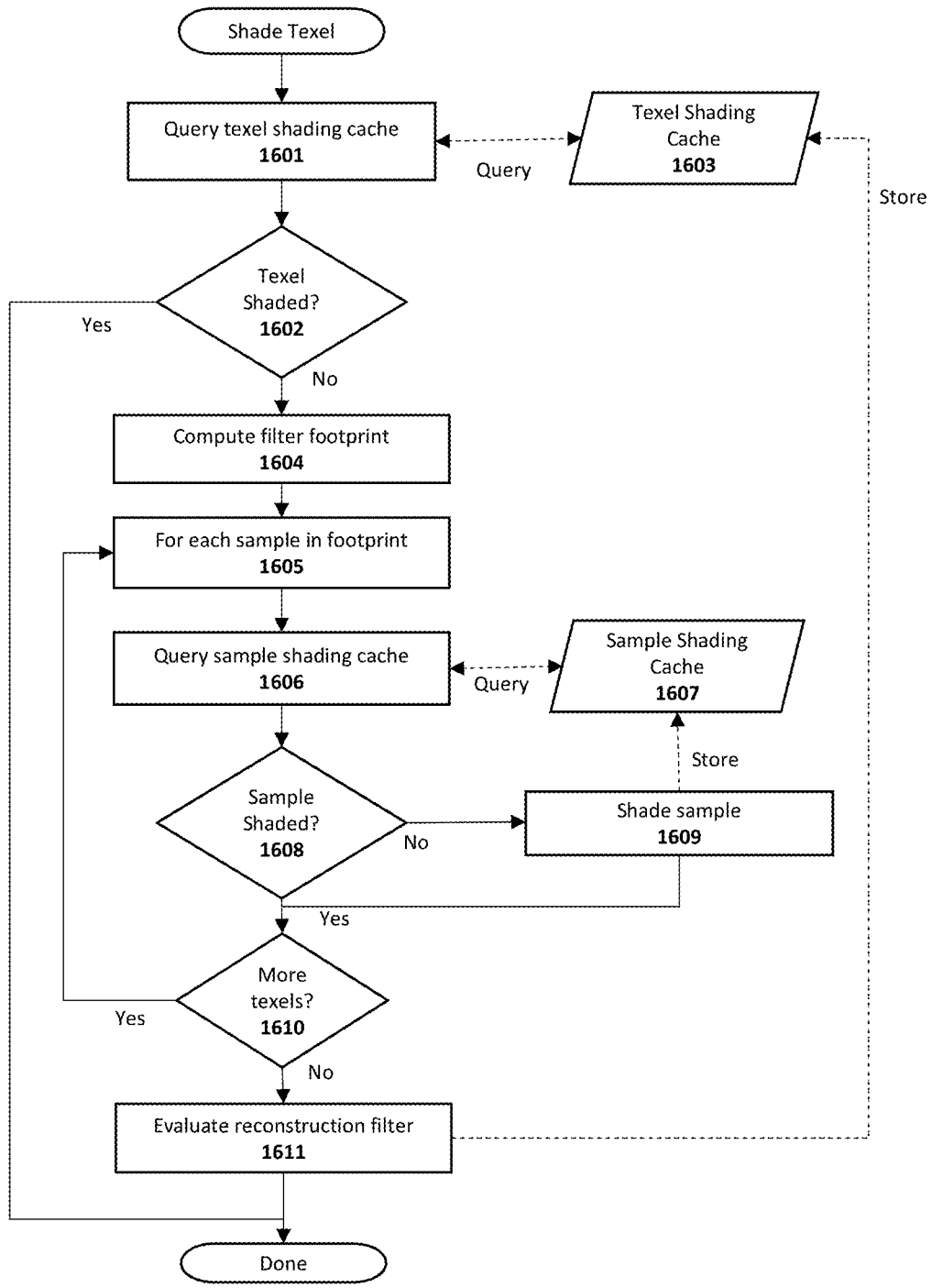
FIG. 16 illustrates a method in accordance with one embodiment of the invention.

FIG. 16 illustrates one embodiment of a flowchart for the operations involved in shading a single texel to obtain its filtered color. In this example, two different shading caches are used to store a) fat samples, and b) filtered color, respectively. The figure denotes the cache holding fat samples as the "sample shading cache", and the cache holding the final filtered color as the "texel shading cache." In other embodiments, the two types of data are held in the same shading cache (see, e.g., FIG. 13), or stored using other mechanisms. It is also possible to store shaded and filtered texels directly to memory.

Turning to the operations in FIG. 16, at 1601, the texel shading cache 1603 is queried to determine if the current texel has already been shaded. If so, determined at 1602, then the process ends. If not, then at 1604, the filter footprint is calculated and, starting at 1605 for each sample in the footprint, the sample shading cache 1607 is queried at 1606. If the sample has not been shaded, determined at 1608, then it is shaded at 1609. If more texels need to be processed, determined at 1610, then the process returns to 1605 and repeats (until no more texels remain). At 1611, the reconstruction filter is evaluated and the results are stored in the texel shading cache 1603, as illustrated.

FIG. 18 illustrates exemplary shader pseudo-code which may be implemented in accordance with an embodiment of the invention. This pseudo-code reflects one embodiment of the algorithm, and how it may be expressed by an application developer.

The operations described above may be performed at different granularities. In one embodiment, individual rays or small packets of rays are traced together, and the tracing, shading, and filtering operations are done entirely on-demand. In this case, the different types of operations will be interleaved at a fine granularity.

In other embodiments, larger batches are rays a traced and processed together. A batch may even involve all the rays required to render the final image. This design may make implementation of each step more efficient since it operates on coherent data and can more easily reuse operations across elements in the same batch. For example, in detecting texels which have not already been shaded, bit masks or other compact control surfaces may be used to tag those texels, before shading and filtering commences in coherent SIMD groups of texels.

As mentioned above, it is possible to apply material-specific filters using the techniques described herein. This may include, for example, filters optimized for diffuse materials or glossy materials. Kernels can even be mixed and the filtered result may be combined. This is illustrated in FIGS. 17A-B.

Figure 17A:
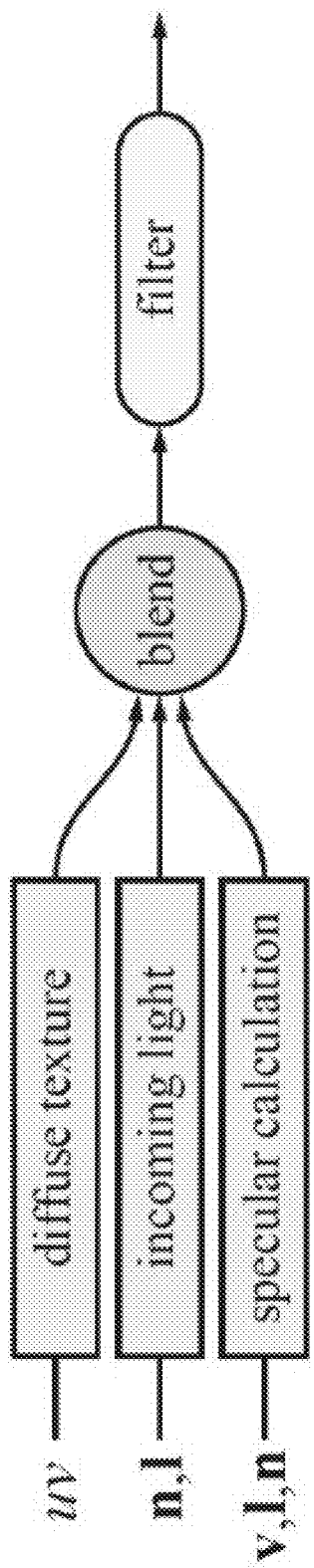
FIGS. 17A-B contrasts an example of a traditional shader graph with techniques employed in one embodiment of the invention.
Figure 17B:
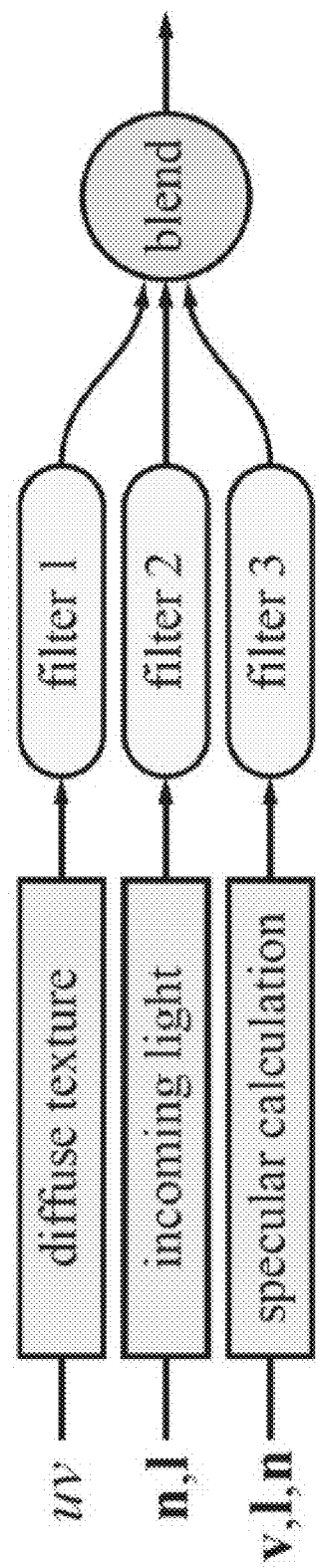

In particular, FIG. 17A shows a traditional shader graph example, where three components, namely diffuse texture lookup, incoming light, and specular calculation are computed separately and then blended together. Finally, any reconstruction filter can be applied. In contrast, in FIG. 17B, using the techniques described herein where the reconstruction filters are applied in texture space, there is greater flexibility because separate domain-specific reconstruction filters can be applied to each term. For example, if ambient occlusion is sampled in the incoming light box, the nearest distance to the occluders may be used as a parameter to the filter kernel.

The embodiments of the invention described herein improve performance over existing architectures in a variety of different ways, some of which are outlined below:

Shading Reuse

By filtering and caching shading directly on each object in the scene, shading can be efficiently reused both spatially and temporally. For example, different primary rays that hit nearby points on a surface can reuse the same filtered color (assuming the material is non-view dependent or nearly so). Similarly, regions of the scene that do not change significantly from frame-to-frame can retain the filtered color on those surfaces. Existing screen-space filtering methods depend on all primary rays being shaded first, before filtering is done, and also cannot easily reuse the result for subsequent frames. Shading and reuse in texture space is not new. However, previous texture-space shading systems have been described in the context of rasterization-based graphics, where only the texels immediately visible from the camera are shaded. See, e.g. BURNS, C. A., FATAHALIAN, K., AND MARK, W. R. 2010. A Lazy Object-Space Shading Architecture with Decoupled Sampling. In High Performance Graphics, 19-28; GRIBEL, C. J., BARRINGER, R., AND AKENINE-MÖLLER, T. 2011. High-Quality Spatio-Temporal Rendering using Semi-Analytical Visibility. ACM Transactions on Graphics, 30, 4, 54:1-54:12; CLARBERG, P., TOTH, R., HASSELGREN, J., NILSSON, J., AND AKENINE-MÖLLER, T. 2014. AMFS: Adaptive Multi-Frequency Shading for Future Graphics Processors. ACM Transactions on Graphics, 33, 4, 141:1-141:12; and ANDERSSON, M., HASSELGREN, J., TOTH, R., AND AKENINE-MÖLLER, T. Adaptive Texture Space Shading for Stochastic Rendering. Computer Graphics Forum, 33(2), 341-350, 2014. By contrast, the embodiments of the invention integrate texel shading in a ray tracer and shade all texels under the footprint of a reconstruction filter.

Filter Complexity

The filter kernels are applied in texture space, and hence do not need to handle inter-object visibility or require (potentially noisy) screen-space guide images. It is thus possible to apply simpler, more efficient filters in the texture space for an equivalent quality compared to more complex filters in the screen space. For example, a simple bilateral filter works quite well in the texture space. For an overview of previous screen-space filtering techniques, refer to ZWICKER, M., JAROSZ, W., LEHTINEN, J., MOON, B., RAMAMOORTHI, R., ROUSSELLE, F., SEN, P., SOLER, C., AND YOON, S.-E. 2015. Recent advances in adaptive sampling and reconstruction for Monte Carlo rendering. Computer Graphics Forum (Proceedings of Eurographics) 34, 2, 667-681.

Second, samples in a texture are more coherent since they lie on the same surface and generally share the same material (even though material parameters may vary). This enables the embodiments of the invention to apply material-specific filters, for example, filter kernel optimized for diffuse materials or glossy materials. Different kernels can even be mixed and the filtered result combined. Screen-space filters do not have this option, since samples from different surfaces are mixed and filtered together.

Camera Effects

In screen space methods, camera effects such as motion and defocus blur add noise to the guide images. For example, the diffuse texture at the first hit (primary ray) along each path is often used a guide image. If the primary rays are stochastically distributed over the lens and/or time, then nearby samples will hit vastly different points on the surfaces, and hence the screen-space guide image of diffuse color will be noisy. The same applies to other channels used as guide images.

The approach described herein does not have that problem. Samples on the surfaces of objects are not affected by camera effects. Since primary visibility is evaluated separately and reuses the filtered texture-space shading, efficient domain-specific filters for primary visibility [Munkberg et al. 2014] can be applied to obtain noise-free defocus and motion blur on top of the filtered texture-space shading.

Filtering on Regular 2D Domains

Embodiments of the invention operate on regular 2D domains (textures), which enables efficient storage and lookup of sample data in 2D grids. This benefit is shared with screen-space techniques. Some previous work has explored filtering and reconstruction in object- or path-space, i.e., storing samples in 3D data structures. Such approaches require expensive 3D searches to locate nearby samples, for example, using kNN-search to find the N nearest neighbors to a point in 3D. See [KELLER, A., DAHM, K., AND BINDER, N. 2014. Path Space Filtering for Integro-approximation Problems. In Proceedings of MCQMC] for an example of path-space filtering. In addition, the path space decomposition technique is related, where separate 2D screen-space buffers are stored at each bounce. See ZIMMER, H., ROUSSELLE, F., JAKOB, W., WANG, O., ADLER, D., JAROSZ, W., SORKINE-HORNUNG, O., AND SORKINEHORNUNG, A. 2015. Path-space Motion Estimation and Decomposition for Robust Animation Filtering. Computer Graphics Forum.

Cached Product Importance Sampling

In a ray tracing scenario using direct illumination from a high dynamic range (HDR) environment map and with materials with complex bidirectional scattering distribution functions (BSDF), many rays have to be traced from the intersection point towards the environment map to faithfully evaluate the illumination integral using Monte-Carlo integration. To reduce the variance, importance sampling techniques may be used. However, if both the lighting and BSDF are complex, standard importance sampling techniques, which samples either according to the lighting or BSDF are inadequate. Here, so called "product importance sampling" techniques are beneficial, which have substantially lower variance at an equivalent number of samples. However, they are very computationally intensive.

To reduce this cost, one embodiment of the invention adaptively caches the product sampling records (PSRs) on-demand in texture space, using the cache structure 1316 described above, or using a separate cache structure. One embodiment of the texture space caching system has been implemented using Catmull-Clark subdivision surfaces. With each face of the base mesh a texture mipmap is stored (e.g., in one embodiment in a manner similar to Ptex [BURLEY, B., AND LACEWELL, D. 2008. Ptex: Per-Face Texture Mapping for Production Rendering. In Eurographics Symposium on Rendering, 1155-1164]). The texels of this embodiment represent not colors, but product sampling records (PSR). Unlike Ptex, connectivity information is not retained, as product sampling records are only shared within a face of the base mesh, and PSRs do not need to be filtered over adjacent faces.

At an intersection point, the identifier of the current patch face is obtained, alongside its patch-barycentric coordinate $(u,v) \in [0,1]$. For each face, a texture, T, is attached with w×h texels. The barycentric coordinates are quantized to the center of the closest texel in T.

If the texel already contains a PSR, we retrieve it, and (re)use it for importance sampling. If the texel is empty, we evaluate the surface to obtain the shading normal at the quantized (u, v) position. Finally the PSR is computed at the quantized (u, v) position, stored into the corresponding texel and used for product importance sampling.

In one embodiment, the cache 1316 is mip-mapped, i.e., each face texture, T, contains a set of mip levels with decreasing resolution. The density of cache records is adaptively controlled within a face by providing texture gradients to the cache lookup, very similar to how texture level of detail (LOD) works in Open Shading Language (OSL) or OpenGL Shading Language (GLSL). For example, on a diffuse, slowly varying surface, fewer PSRs are needed and the mip bias can increase.

Thus, the coarser mip levels are populated, resulting in savings in memory and PSR construction time. Similarly, for faces with small screen space projections, fewer PSRs may be appropriate. In practice, face textures may be sparsely populated, often with PSRs in a single mip-level.

In one embodiment, HDR environment maps are used and the environment map probability density function (PDF) quad tree is precomputed at render setup. This quad tree can be reused in all PSRs. In one embodiment, product importance sampling closely follows an approach by Clarberg and Akenine-Möller in [CLARBERG, P., AND AKENINE-MÖLLER, T. 2008. Practical Product Importance Sampling for Direct Illumination. Computer Graphics Forum (Proceedings of Eurographics 2008) 27, 167 2, 681-690]. When constructing the quad tree for the reflectance function (BSDF times cosine term), the 2D slice of the material is evaluated at the current intersection point.

In the cached version, each PSR is reused within a region in texel space, so when sampling the material, samples are drawn from a set of locations within the current texel's footprint in texture space. Note that each location has a unique surface normal and view vector. At each intersection, a set of Poisson samples is warped according to the PSR using hierarchical sampling warping [CLARBERG, P., JAROSZ, W., AKENINE-MÖLLER, T., AND JENSEN, H. W. 2005. Wavelet Importance Sampling: Efficiently Evaluating Products of Complex Functions. ACM Transactions on Graphics, 24, 3, 1166-1175].

Figure 19:
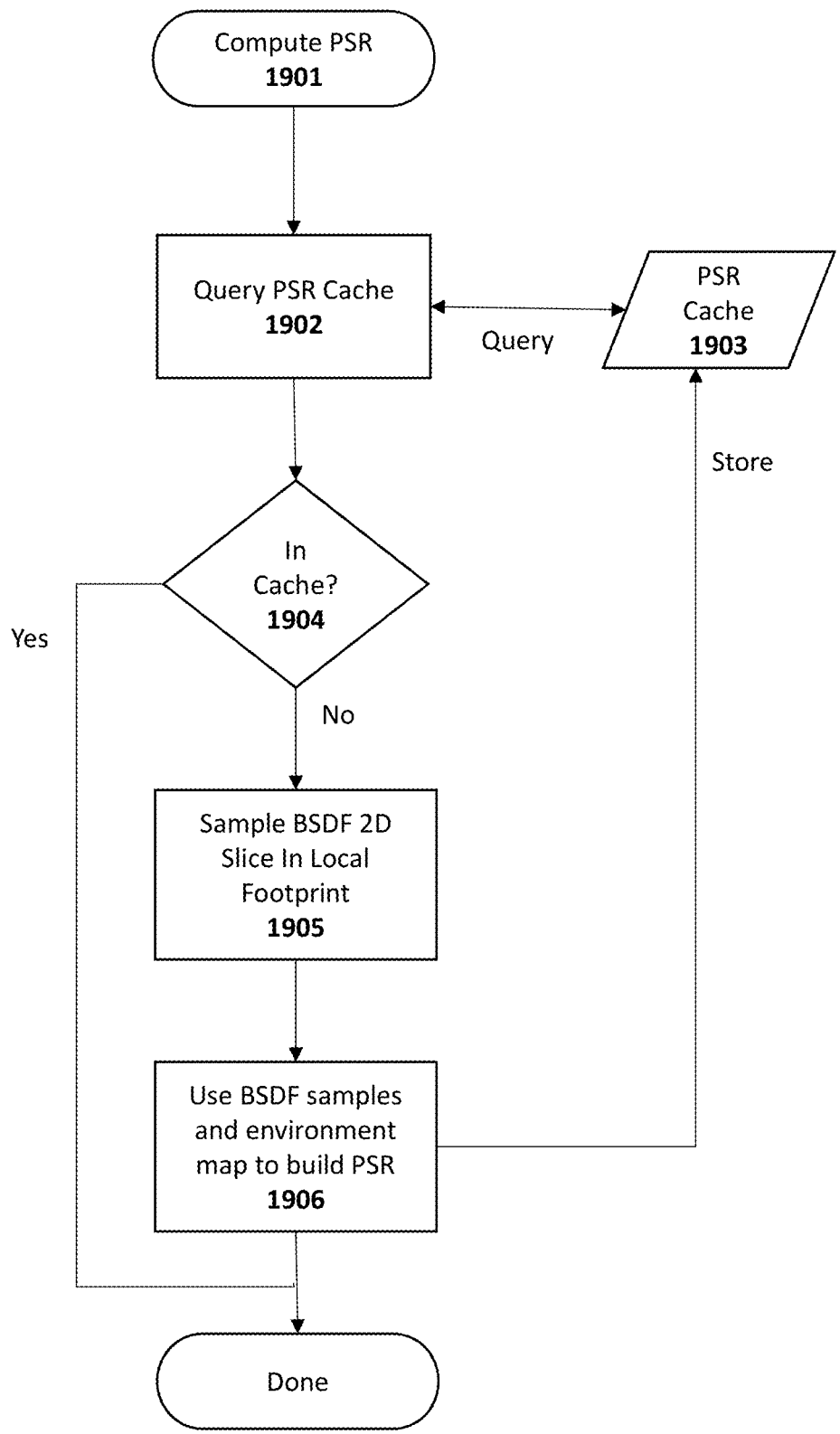
FIG. 19 illustrates a method in accordance with one embodiment of the invention.

FIG. 19 illustrates a method in accordance with one embodiment in which product sampling records (PSR) are computed and cached. The method may be implemented within the context of the system architecture described above (e.g., using the cache 1316 as the PSR cache), but is not limited to any particular system architecture.

At 1901 a current PSR is computed. At 1902, the PSR cache 1903 is queried to determine whether an entry for the PSR is currently cached. As mentioned, the PSR cache 1903 may be implemented in a manner similar to cache 1316 described with respect to FIG. 13. If an entry for the PSR is found in the cache 1903, then the entry is used and the process is complete. If not, then at 1905 a bidirectional scattering distribution functions (BSDF) slice is sampled in the local footprint and at 1906, the BSDF samples and environment map are used to build the PSR. An entry for the PSR may then be stored in the PSR cache 1903 as illustrated.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method comprising:
performing texture mapping to map one or more textures to surfaces of one or more objects in texture space within a ray tracing architecture; and
performing sampling and reconstruction directly on the surfaces of the objects in the texture space to generate filtered texture-mapped object data, wherein performing sampling and reconstruction further comprises:
sampling and caching individual texels and/or groups of texels; and
when all texels under a footprint of a reconstruction filter kernel are available from a cache, evaluating the reconstruction filter, and caching a resulting color for later reuse to a per-face texture, the texels under the footprint including currently visible and currently not visible texels,
wherein reconstruction directly on the surfaces of the objects removes noise from the objects in the texture space; and
wherein sampling and reconstruction is triggered and cached within the footprint of the reconstruction filter.

2. The method as in claim 1 wherein performing sampling and reconstruction further comprises:
querying a texel shading cache to determine whether a current texel has been shaded;
if the current texel has not been shaded then computing a filter footprint and querying a sample shading cache for each sample within the filter footprint to determine whether each sample has been previously shaded;
using the sample from the sample shading cache if the sample has been previously shaded or shading the sample if it has not been previously shaded and storing the shaded sample in the sample shading cache; and
when all texels under a footprint of a reconstruction filter kernel are shaded, evaluating the reconstruction filter, and caching the results in the texel shading cache for later reuse.

3. The method as in claim 1 wherein the textures include one or more mip-maps.

4. The method as in claim 3 wherein each mip-map comprises multiple levels of detail (LOD) to represent the textures.

5. The method as in claim 1 further comprising:
performing ray tracing-based based rendering on the filtered texture-mapped object data to generate a set of rendered image frames.

6. The method as in claim 1 further comprising:
parameterizing shading values as grids in a local uv-coordinate space of a current patch.

7. The method as in claim 6 wherein when a filter extends beyond the current patch, adjacency information is used to locate texels from neighboring patches.

8. The method as in claim 6, wherein the grids are hierarchically organized as an image pyramid of shading values per face, which are lazily populated based on ray differentials on an incoming ray that trigged the texture mapping.

9. The method as in claim 1 wherein each texel comprises a product sampling record (PSR), each PSR to be used for importance sampling.

10. The method as in claim 9 wherein one or more of the PSRs are to be stored within a cache so as to be available on-demand in the texture space.

11. The method as in claim 10 further comprising:
retrieving and using the cached PSR to guide importance sampling for all direct illumination shading evaluations within a local footprint in texture space.

12. The method as in claim 11 further comprising:
computing a PSR identifier;
querying the cache using the PSR identifier to determine whether the PSR is stored therein;
if the PSR is stored in the cache, then mapping the PSR to the surfaces of one or more objects in texture space; and
if the PSR is not stored in the cache, then building the PSR and storing the PSR in the cache.

13. The method as in claim 12 wherein building the PSR comprises:
sampling a bidirectional scattering distribution function (BSDF) slice in a local footprint of a reconstruction filter kernel; and
using BSDF samples and an environment map to build the PSR.

14. An apparatus comprising:
object/texture space circuitry to perform texture mapping to map one or more textures to surfaces of one or more objects in texture space within a ray tracing architecture; and
a shading and reconstruction filter to perform sampling and reconstruction directly on the surfaces of the objects in the texture space to generate filtered texture-mapped object data, wherein to perform sampling and reconstruction the shading and reconstruction filter further:
samples and caching individual texels and/or groups of texels; and
when all texels under a footprint of a reconstruction filter kernel are available from a cache, evaluates the reconstruction filter, and caches a resulting color for later reuse to a per-face texture, the texels under the footprint including currently visible and currently not visible texels,
wherein reconstruction directly on the surfaces of the objects removes noise from the objects in the texture space; and
wherein sampling and reconstruction is triggered and cached within the footprint of the reconstruction filter.

15. The apparatus as in claim 14 wherein performing sampling and reconstruction further comprises:
querying a texel shading cache to determine whether a current texel has been shaded;
if the current texel has not been shaded then computing a filter footprint and querying a sample shading cache for each sample within the filter footprint to determine whether each sample has been previously shaded;
using the sample from the sample shading cache if the sample has been previously shaded or shading the sample if it has not been previously shaded and storing the shaded sample in the sample shading cache; and
when all texels under a footprint of a reconstruction filter kernel are shaded, evaluating the reconstruction filter, and caching the results in the texel shading cache for later reuse.

16. The apparatus as in claim 14 wherein the textures include one or more mip-maps.

17. The apparatus as in claim 16 wherein each mip-map comprises multiple levels of detail (LOD) to represent the textures.

18. The apparatus as in claim 14 further comprising:
ray-tracing-based rendering circuitry/logic to perform ray tracing-based based rendering on the filtered texture-mapped object data to generate a set of rendered image frames.

19. The apparatus as in claim 14 wherein the shading and reconstruction filter is to parameterize shading values as grids in a local uv-coordinate space of a current patch.

20. The apparatus as in claim 19 wherein when a filter extends beyond the current patch, adjacency information is used to locate texels from neighboring patches.

21. The apparatus as in claim 14 each texel comprises a product sampling record (PSR), each PSR to be used for importance sampling.

22. The apparatus as in claim 21 wherein one or more of the PSRs are to be stored within a cache so as to be available on-demand in the texture space.

23. The apparatus as in claim 22 wherein the cached PSR is to be retrieved and used to guide importance sampling for all direct illumination shading evaluations within a local footprint in texture space.

24. The apparatus as in claim 21 wherein the object/texture space circuitry and/or logic is to perform the operations of:
computing a PSR identifier;
querying the cache using the PSR identifier to determine whether the PSR is stored therein;
if the PSR is stored in the cache, then mapping the PSR to the surfaces of one or more objects in texture space; and
if the PSR is not stored in the cache, then building the PSR and storing the PSR in the cache.

25. The apparatus as in claim 24 wherein building the PSR comprises:
sampling a bidirectional scattering distribution function (BSDF) slice in a local footprint of a reconstruction filter kernel; and
using BSDF samples and an environment map to build the PSR.

26. A system comprising:
a memory to store data and program code;
a central processing unit (CPU) comprising an instruction cache for caching a portion of the program code and a data cache for caching a portion of the data, the CPU further comprising execution logic to execute at least some of the program code and responsively process at least some of the data, at least a portion of the program code comprising graphics commands;
a graphics processing subsystem to process the graphics commands and responsively render a plurality of image frames, the graphics processing subsystem comprising:

object/texture space circuitry and/or logic to perform texture mapping to map one or more textures to surfaces of one or more objects in texture space within a ray tracing architecture; and a shading and reconstruction filter to perform sampling and reconstruction directly on the surfaces of the objects in the texture space to generate filtered texture-mapped object data, wherein to perform sampling and reconstruction the shading and reconstruction filter further:

samples and caching individual texels and/or groups of texels; and when all texels under a footprint of a reconstruction filter kernel are available from a cache, evaluates the reconstruction filter, and caches a resulting color for later reuse to a per-face texture, the texels under the footprint including currently visible and currently not visible texels, wherein reconstruction directly on the surfaces of the objects removes noise from the objects in the texture space; and wherein sampling and reconstruction is triggered and cached within the footprint of the reconstruction filter.

* * * * *